United States Patent [19]
Hagerman et al.

[11] Patent Number: 5,846,579
[45] Date of Patent: Dec. 8, 1998

[54] HARD CHEESE HAVING GREATER RESILIENCE AND A FULLER FLAVOR

[75] Inventors: Claes-Göran Hagerman, Klippan; Katarina Lindberg, Helsingborg, both of Sweden

[73] Assignee: Extraco AB, Klippan, Sweden

[21] Appl. No.: 633,795

[22] PCT Filed: Oct. 21, 1994

[86] PCT No.: PCT/SE94/00993

§ 371 Date: Apr. 18, 1996

§ 102(e) Date: Apr. 18, 1996

[87] PCT Pub. No.: WO95/10945

PCT Pub. Date: Apr. 27, 1995

[30] Foreign Application Priority Data

Oct. 21, 1993 [SE] Sweden .................................. 9303469

[51] Int. Cl.⁶ .................................................. A23C 19/055
[52] U.S. Cl. .............................. 426/36; 426/40; 426/582; 426/576
[58] Field of Search ................................ 426/36, 40, 582, 426/576

[56] References Cited

U.S. PATENT DOCUMENTS

| | | | |
|---|---|---|---|
| 4,684,533 | 8/1987 | Kratochvil | 426/576 |
| 5,080,913 | 1/1992 | Gamay | 426/39 |
| 5,104,674 | 4/1992 | Chen et al. | 426/496 |
| 5,194,282 | 3/1993 | Grossman et al. | 426/576 |
| 5,225,220 | 7/1993 | Gamay | 426/582 |
| 5,330,773 | 7/1994 | Piliero et al. | 426/582 |
| 5,395,630 | 3/1995 | Gamay | 426/582 |
| 5,395,631 | 3/1995 | Sweeney | 426/42 |

FOREIGN PATENT DOCUMENTS

| | | |
|---|---|---|
| 0 289 096 | 11/1988 | European Pat. Off. . |
| 0 415 832 | 3/1991 | European Pat. Off. . |
| 0 427 310 | 5/1991 | European Pat. Off. . |
| 2 248 170 | 4/1992 | United Kingdom . |
| WO 91/03164 | 3/1991 | WIPO . |
| 94/14334 | 7/1994 | WIPO ...................................... 426/576 |

OTHER PUBLICATIONS

"Manufacture of Cheese Substitute", General Foods Corp., Japanese Kokai Tokkyo Koho JP 62 58953, Abstract No. 7646c, vol. 107, No. 9, 3 Aug. 1987, p. 589.

Abou–El–Ella et al. CAB abstract, Acc. # 790449319 of Milchwissenschaft. vol. 34 (1979), pp. 89–90, 1979.

Habermann. WPIDS abstract, Acc. #78–72926A of DE 2701361, Oct. 1978.

Schrieber et al. CAB abstract, Acc. # 750421183 of Deutsche Milchwirtschaft. vol. 26 (1975), pp. II–VI, 1975.

*Primary Examiner*—William H. Beisner
*Attorney, Agent, or Firm*—Burns, Doane, Swecker & Mathis, L.L.P.

[57] ABSTRACT

Hard cheese containing gelatin, as well as a method for making it, is disclosed. The method comprises the steps of adding a starter culture to milk, ripening the milk, adding rennet, breaking the resulting coagel to curd, agitating the curd, drawing off whey and pressing the curd, either before or after the drawing-off of whey, and then shaping and ripening the curd. The method is distinguished by adding gelatin a) to the milk before the addition of rennet, or b) to the curd after the whey has been wholly or partly drawn off in the making of granular-eyed cheese.

10 Claims, No Drawings

HARD CHEESE HAVING GREATER RESILIENCE AND A FULLER FLAVOR

This invention relates to hard cheese, preferably low-fat hard cheese, as well as a method of making it.

According to the definition and classification under the FAO/WHO General standard for cheese, cheese is divided into three categories:

a) Ripened cheese not ready to be consumed immediately after production—hard cheese;

b) Mould-ripened cheese—soft cheese; and c) Unripened cheese or green cheese for immediate consumption—green cheese and others.

Furthermore, cheese is classified according to hardness, fat content and ripening process.

a) Ripened cheese—hard cheese

Conventional hard cheese is exclusively made from milk. When curdled, the milk undergoes several steps typically used when making hard cheese, such as tempering, souring, addition of rennet, breaking of coagel, and postheating involving various temperature and agitation programmes. The purpose is to give the cheese grains the correct bacteriological and chemical composition before salting, pressing and storing.

A characteristic feature of hard cheese is that it is not ready to be eaten immediately after production. Thus, the cheese has to be stored under special conditions as regards time, temperature and humidity. The ripening process of the hard cheese depends on its active microbiological flora as well as its content of proteins, carbohydrates, fat, water and salt. If one is to obtain the right taste, consistency, texture, fat content and so forth of the cheese, the whole curdling and storing process has to be optimised. The consistency of the cheese ranges from hard to semihard/semisoft.

b) Mould-ripened cheese—soft cheese

Soft cheese is made from milk and is treated with mould cultures. Curdling stops after the breaking of coagel, and there is no postheating. Soft cheese is distinguished by a brief ripening phase under the influence of decomposition products from mould growth and high content of water in the fat-free portion (short keeping time). Examples of soft cheese are Camembert, Brie and various sorts of blue mould cheese.

c) Unripened cheese

Green cheese (fresh cream cheese) is made from milk to which is added a starter culture and sometimes an insignificant amount of rennet. The curd is finely divided into a homogeneous mass and may, if so desired, be mixed with cream and be seasoned. Green cheese, which by definition is a fresh product, is pasteurised to improve its keeping qualities. Green cheese is ready to be eaten immediately after production and does not ripen. The cheese is soft and easy to spread. Examples of Swedish green cheese are Bon Appétit, Crème Bonjour and Lätta.

Processed cheese (resolidified cheese) is made by melting such hard cheese as has not met the quality requirements for being put on the market. The cheese may have the wrong shape, colour or texture, or it may have been infected with undesirable bacteria. Melting involves the addition of, inter alia, melting salts (phosphates) at an elevated temperature. The cheese is ready to be eaten immediately after production and does not ripen. Examples of Swedish processed cheese are Hushålls mjukost and Kavli smältost.

Since people generally strive to reduce the total amount of fat in their diet, there has been an increasing demand for low-fat food products. Thus, there has been a development towards products of reduced fat content, for instance such dairy products as low-fat milk and cream, as well as various types of sour milk and edible fat products. In order to avoid problems with e.g. the stability of such products, thickening and/or stabilising agents, for instance gelatin, are added. The unique quality of gelatin is that its melting point corresponds to the temperature in the mouth. Thus, such a product as yoghourt is stabilised with the aid of gelatin in order to avoid the syneresis and the separation of any fruit content. Low-fat margarine owes its stability and easy-to-spread quality to an addition of gelatin.

On the market, there are also cheese products to which gelatin has been added. These products include various types of natural and seasoned soft cheese (e.g. green cheese or cheese of Camembert type). EP Patent Application 0 415 832 discloses a method of making a cheese product to which e.g. gelatin is added. The gelatin is added to make the curd seem homogeneous and resilient to the consumer.

In the Scandinavian countries, hard cheese is the predominant variety. As stated in the definition given above, hard cheese obtains its final properties only after a ripening process. For centuries, cheese has in Sweden been produced by hand under the supervision of skilled craftsmen. Also today, cheese makers strive to maintain the high standard of conventional types of cheese. Thus, such factors as political decisions, high quality requirements as well as legislation have hampered the development of products containing alternative ingredients.

Although there are a number of low-fat hard cheese products on today's market, these are very unsatisfactory in many respects. Thus, the known low-fat hard cheeses are without exception mild cheeses of nondescript taste.

Thus, there is a demand for low-fat hard cheese having good qualities of consistency, flavour, aroma, appearance, texture, ripening process and keeping time.

According to the invention, the above drawbacks are obviated by adding gelatin during the production of hard cheese.

Thus, this invention relates to hard cheese, which is characterised in that it contains 0.1–5% by weight of gelatin, based on its total weight.

The invention further concerns a method of making hard cheese, comprising the steps of adding a starter culture to milk, ripening the milk, adding rennet, breaking the resulting coagel to curd, agitating the curd, drawing off whey and pressing the curd, either before or after the drawing-off of whey, and then shaping the curd and ripening it, characterised by adding gelatin a) to the milk before the addition of rennet or b) to the curd after the whey has been wholly or partly drawn off.

When making round-eyed hard cheese, the curd has to be compressed in liquid to prevent the ingress of air to the thus-compressed curd. If the gelatin is to be admixed to the curd for producing round-eyed cheese, it therefore has to be added before the pressing. Thus, there are two ways of adding the gelatin. One alternative is to add the gelatin to the milk before the addition of rennet. In the other alternative, the curdling is carried out in customary fashion up to the drawing off of whey. Then, some of the whey is drawn off, whereupon the gelatin is added to the remainder of the curd. The curd is then pressed, also this in liquid, and the rest of the whey is drawn off.

The gelatin is added in the form of a solution, a gel or a powder to the milk or the whey after the partial drawing-off thereof.

In order to produce granular-eyed cheese, air has to be introduced into the curd. To this end, the whey is strained off, and the curd is aired by agitation before pressing. In this case, the gelatin is preferably added after the drawing off of whey.

Adding the gelatin after the whey has been wholly or partly drawn off has the advantage of a reduced loss of gelatin, since no gelatin, or but a small amount thereof, is entrained by the whey that is drawn off. Owing to the presence of gelatin, a larger amount of whey will remain after the subsequent final pressing, resulting in a larger yield of cheese.

The gelatin added to the curd after the whey has been strained off may be in the form of a solution, a gel or, which is preferred, a dry, finely ground powder. The gelatin is added during mechanical processing.

A suitable addition of gelatin is in the range of 0.1–5.0% by weight, based on the total weight of the finished cheese. An addition of 0.3–2.5% by weight of gelatin has proved to be especially advantageous and results in more flexible and softer cheese. When such amounts of gelatin are added, the cheese develops more rapidly and obtains a more full-flavoured and agreeable taste than does a reference cheese. The cheese produced will have a somewhat sour aftertaste.

Further, the finished cheese has a fat content of up to 40% by weight, preferably up to 30% by weight, and most preferred 5–20% by weight, depending on e.g. the fat content of the milk.

In the preferred mode of implementation of the inventive method, the gelatin is added to the curd after the whey has been wholly or partly drawn off. This mode of implementation has the advantage of reducing the loss of gelatin, as mentioned in the foregoing.

The addition of gelatin further results in a slight reduction of the fat content of the cheese produced, due to the retention of a larger amount of whey in the cheese.

To sum up, hard cheese with an addition of gelatin has the following advantages over reference cheese produced under identical conditions but with no addition of gelatin:
the possibility of producing cheese of lower fat content
more resilient consistency
better and more full-flavoured taste
more rapid ripening process
higher yield.

The reference cheese has the following disadvantages as compared with the hard cheese with an addition of gelatin:
unresilient consistency
dry and/or mild taste
slower ripening process
lower yield.

Use can be made of gelatin of different gel strength, as measured according to Bloom, and different degrees of grinding. The aimed-at qualities of the end product determine the choice of gel strength of the gelatin, which may vary between 100 Bloom and 280 Bloom. Suitable gelatin has a gel strength of 250 Bloom.

The invention will now be illustrated in more detail with the aid of a few Examples.

EXAMPLE 1

| | Granular-eyed cheese | |
|---|---|---|
| Ingredients | Amount | Remark |
| Milk | 17 kg | 1.6% fat |
| CaCl$_2$ | 15 g/100 l | 9% DS |
| NaNO$_3$ | 15 g/100 l | 9% DS |
| Starter culture | 0.7–1.4% | Probat ™ 505, Visbyvac ™ |
| Rennet | 30 ml/100 l | Standard 1/10,000, diluted to 1:5 |
| Water | 20% of remaining | Boiled and tempered |
| Gelatin | 0.3–5.0% of wet curd milk | 250 Bloom (finely ground) |
| Delvocid ™ | — | 0.3% DS |

The milk is heated to 31° C. for about 1 h, whereupon calcium chloride and sodium nitrate are added. Then, the starter culture is added, and the milk is ripened for 20 min. Rennet is added at 31° C. and allowed to act for 30–35 min. The coagel formed is broken to a particle size of 8 mm. The curd is pre-agitated at 31° C. for 25 min, whereupon whey is drawn off in an amount of about 47% of the total amount of milk. The remainder is heated by an addition of water having a temperature of 38°–44° C. for 25 min, whereupon the mixture is postagitated for 10 min at 37° C.

The whey is then strained off, and the curd is aired by hand.

Thereafter, the curd is weighed, and dry and finely-ground gelatin is added during mechanical processing.

The curd is placed in Kadova™ vats and is pressed overnight to cheese. These cheeses are immersed in saturated brine at 11°–12° C. for 4 h, and are then allowed to drip-dry at room temperature. Thereafter, the cheeses undergo an antimould treatment with Delvocid™ solution. The cheeses are vacuum-packed in Cryovac™ bags and stored for 2 months at 14° C.

The finished cheeses have a fat content of about 17% by weight, based on their total weight.

Reference cheeses are produced according to the same method but with no addition of gelatin. Thus, the cheeses with an addition of gelatin obtain a more resilient consistency, as well as a better and more full-flavoured taste, and ripen more rapidly. In addition, the yield of cheese is higher when gelatin has been added. The reference cheeses are unresilient, have a dry and/or mild taste, ripen more slowly and has a lower yield.

Depending on the amount of starter culture added and on the souring procedure, whey may additionally be drawn off after pre-agitation for 10 min. The corresponding amount of water is added at the same temperature, and intermediate agitation takes place before the next time whey is to be drawn off.

EXAMPLE 2

Round-Eyed Cheese

The production process resembles that of granular-eyed cheese, but gelatin in the form of a solution is added to the milk before the addition of rennet in order to avoid any disruptions of the eye formation. Thus, 0.6% of gelatin is added. The production proceeds in the same way as in the case of granular-eyed cheese up to the straining-off of whey. Then, the cheese grains are instead pressed below the liquid level of the whey for about 15–20 min, whereupon the curd is cut and placed in cheese-making vats before the final pressing.

EXAMPLE 3

The production process resembles that described above, but gelatin is instead added at a later stage of the curdling.

After part of the whey has been drawn off, 1.5% of gelatin is added, based on the remainder in the cheese-making vat. The cheese grains are pressed below the liquid level of the whey and are treated in customary fashion.

We claim:

1. A hard cheese product consisting essentially of a hard cheese which has been processed at a temperature of at least about 37° C. during its formation and has undergone ripening in a final stage of its formation and contains 0.1–5% by weight of a gelatin based on the total weight of said hard cheese wherein said gelatin has a gel strength which ranges from 100 bloom to 280 bloom and wherein the hard cheese product following said ripening serves to facilitate more resilience and a more full-flavored taste than that of a reference hard cheese prepared in the same manner which lacks said gelatin.

2. A hard cheese product according to claim 1, which was produced by adding a starter culture to milk, ripening the milk, adding rennet, breaking the resulting coagel to curd, agitating the curd, drawing off whey and pressing the curd, either before or after the drawing-off of whey, and subsequently shaping the curd and ripening it, with said gelatin being added (a) to the milk before the addition of rennet or (b) to the curd after the whey has been wholly or partly drawn off.

3. A hard cheese product according to claim 1 wherein the hard cheese contains 0.3–2.5% by weight of said gelatin based on the total weight of said hard cheese.

4. A hard cheese product according to claim 1 wherein said gelatin has a gel strength of 250 Bloom.

5. A method of making a hard cheese product consisting essentially of: adding a starter culture to milk; ripening the milk; adding rennet; breaking the resulting coagel to curd; agitating the curd; drawing off whey and pressing the curd, either before or after the drawing-off of whey; heating the curd to a temperature of at least about 37° C.; and subsequently shaping the curd and ripening it, wherein the method further includes adding gelatin in an effective concentration (a) to the milk before the addition of rennet or (b) to the curd after the whey has been wholly or partly drawn off, wherein said gelatin has a gel strength which ranges from 100 bloom to 280 bloom so as to form a hard cheese product having more resilience and a more full-flavored taste than that of a reference hard cheese prepared in the manner which lacks said gelatin.

6. A method for making a hard cheese product according to claim 5, wherein said gelatin when added is in the form of a gel, a solution, or a powder.

7. A method for making a hard cheese product according to claim 6, wherein said gelatin is added in a concentration of 0.1–5.0% by weight, based on the total weight of the hard cheese that is produced.

8. A method for making a hard cheese product according to claim 5, wherein said gelatin is added in a concentration of 0.1–5.0% by weight based on the total weight of the hard cheese product that is produced.

9. A method for making a hard cheese product according to claim 5 wherein said gelatin is added in a concentration of 0.3–2.5% by weight based on the total weight of the hard cheese product that is produced.

10. A method of making a hard cheese product according to claim 5 wherein said gelatin has a gel strength of 250 Bloom.

* * * * *